3,674,628
TUBULAR AND POROUS FIBRES
Albert Fabre, Lyon, France, assignor to Rhone-Poulenc S.A., Paris, France
No Drawing. Filed Oct. 27, 1969, Ser. No. 869,897
Claims priority, application France, Oct. 29, 1968, 171,845
Int. Cl. D01d 5/24
U.S. Cl. 161—178                    4 Claims

ABSTRACT OF THE DISCLOSURE

Tubular fibres suitable for use in ultrafiltration, reverse osmosis and for separation processes, containing a continuous axial channel and having a skin over a peripheral external or internal open microporous zone, are prepared by extruding a polymer solution through an annular spinnerette and coagulating one or both peripheral zones of the fibre.

---

The present invention provides tubular fibres which may be used in reverse osmosis, in the separation of gases and in ultrafiltration. Such fibres possess an axially-disposed continuous channel which is devoid of macromolecular material.

In the description of the present invention, the following definitions are used.

A material is said to have a "compact structure" when any pores which it may contain have a diameter of less than 500 A.

The term "vacuoles" is used to denote spaces included in the substance forming the fibre devoid of macromolecular products, and of which the largest dimension is more than 5 microns.

The term "skin" is used to denote an internal or external surface layer of compact structure.

The term "peripheral external zone" is used to denote the external part of the fibre, the thickness of which is one-quarter to half the distance separating the exterior of the fibre from the axially-dispersed channel, it being understood that this external part of the fibre may optionally be covered by a skin.

The term "peripheral internal zone" is used to denote the part of the fibre which surrounds the axially-dispersed channel, the thickness of which is one-quarter to half the distance separating the exterior of the fibre from the axially-disposed channel, it being understood that this part surrounding the axially-disposed channel may be separated from this channel by a skin.

According to the present invention there is provided a tubular fibre containing an axially-disposed continuous channel devoid of macromolecular material and having a skin (as hereinbefore defined) over a peripheral external, or a peripheral internal, zone (as hereinbefore defined), or both, the zone or zones comprising a network of mutually intercommunicating pores of a diameter from 500 A. to 30,000 A. and being essentially free from vacuoles (as hereinbefore defined). Preferably the fibres are entirely free from vacuoles.

The present invention also provides a process for preparing such a fibre which comprises (a) extruding a solution of a fibre-forming polymer from a spinneret having an annular orifice; (b) gelling the external peripheral, and optionally the internal peripheral, zone, and (c) simultaneously or subsequently subjecting one or both peripheral zones, whether gelled or non-gelled, to the action of a coagulating agent.

The external peripheral zone is generally gelled by cooling. This cooling is conveniently achieved by bringing the extruded polymer solution into contact with a fluid at a temperature below the gelling temperature of the polymer solution. Where gelling is carried out with a gaseous fluid, this fluid can be subjected to a relatively rapid translatory movement which can be oriented in a direction parallel to that of the filament. This fluid may additionally be charged with water vapour or the vapour of some other solvent. The setting of the internal peripheral zone can be achieved in the same way by cooling.

Where gelling is carried out with a liquid, this liquid may, in addition to its gelling effect, also impart a coagulating effect.

In all cases the coagulation is effected by bringing the filament which is being formed into contact with a coagulating liquid. In the case of the external peripheral zone it suffices to pass this set filament which is being formed into a coagulating bath. The internal peripheral zone is subjected to coagulation by injecting into the core of the filament being formed a fluid which coagulates the polymer solution.

The nature of the coagulant selected depends on the solvents used for the fibre-forming material and the choice depends on criteria known in the field of wet spinning. It is adavntageous to use a powerful coagulating agent for the set peripheral zone and a slow coagulating agent for a non-gelled internal zone. By a powerful coagulating agent is meant a medium in which the macromolecular material is completely insoluble. By a slow coagulating agent is meant a medium in which the macromolecular material is partially soluble. In all cases, after obtaining the tubular fibre by the process of the invention drying is carried out in a manner known per se.

One process for the preparation of tubular fibres according to the invention which are entirely free from vacuoles consists, in the case of acrylonitrile homopolymer or copolymer fibres, of extruding a solution of the acrylonitrile polymer in dimethyl sulphoxide containing a dissolved agent for raising the gelling temperature of the polymer solution, for example, urea, magnesium chloride or ethylene glycol, as hereinbefore described and using water or glycol as the injected internal coagulating agent at the same temperature as the polymer solution; in passing this filament through water and/or glycol at a temperature below the gelling temperature of the polymer solution, to both gel and coagulate the external zone, and finally in drying the resulting fibre.

The nature of the macromolecular material employed in the preparation of the tubular fibres according to the invention is not critical; for example, polyacrylonitrile, copolymers of acrylonitrile with other monomers such as methyl methacrylate, polyurethanes and polyvinyl chloride may be used.

The fibres according to the invention may be used in ultrafiltration, especially in artificial kidneys, in reverse osmosis, especially in the desalination of saline liquids such as seawater, and in the separation of gases. Apparatus which require such fibres are known. The essential value of the tubular fibres according to the invention, which consist of one or two skins containing a microporous mass, is that they selectively allow the various constituents of the liquid or gaseous fluids subjected to purification or separation to pass through them at a high flow rate for a given volume of fibre.

The following examples illustrate the invention.

EXAMPLE 1

A spinneret, having an annular orifice of internal diameter 0.6 mm. into which projected a hollow acicular mandrel of external diameter 0.4 mm., coaxially disposed, was positioned in air at ambient temperature 10 cm. above a bath of water at 4° C. (external coagulating bath) with its axis vertically disposed.

A polymer solution maintained at 70° C. and obtained by dissolving a terpolymer of acrylonitrile, methyl methacrylate and potassium p-vinyloxybenzenesulphonate in a mixture of water with dimethylsulphoxide (DMSO) in a weight ratio of 11 to 89 was extruded from this spinneret vertically downwards at the rate of 1.5 cm.³/minute. The polymer used consisted of 94.1% by weight of the acrylonitrile component, 5.2% by weight of the methyl methacrylate component and 0.7% by weight of the potassium p-vinyloxybenzenesulphonate component. Its specific viscosity was 0.4, measured with a 2 g/l. solution in dimethylformamide (DMF) at 25° C. The concentration of the polymer solution was 8% by weight.

A mixture of water with DMSO in a weight ratio of 50 to 50 was simultaneously injected through the hollow acicular mandrel (acting as internal coagulating bath) into the extrudate at the rate of 0.32 cm.³/minute and at a temperature of about 23° C.

After issuing from the spinneret and passing through air which acted as gelling fluid, the hollow fibre descended vertically through the external coagulating bath for a distance of 1 metre. It was thereafter removed from this bath at a speed of 2.5 m./minute and then wound on a drum sprinkled with pure water (duration 4 minutes).

The fibre was thereafter dried at ambient temperature and then coiled up without stretching.

A tubular fibre was thus obtained. Its external diameter was 0.4 mm.; its internal diameter was 0.2 mm.; it had an external skin less than 2μ thick and an external peripheral zone, comprising a network of mutually intercommunicating pores whose average diameter ranged from 500 A. to 3,000 A. and free from vacuoles, which was about 30μ thick.

EXAMPLE 2

Example 1 was repeated with the following modifications:

(a) The polymer solution consisted of a 15% by weight solution of the terpolymer in a mixture of water with DMF in the weight ratio of 7 to 93;

(b) The internal coagulating bath was a mixture of water with DMF in the weight ratio of 30 to 70.

A tubular fibre of external diameter 0.4 mm. and internal diameter 0.2 mm. was obtained; it had an external skin less than 0.8μ thick and an external peripheral zone, comprising a network of mutually intercommunicating pores whose average diameter ranged from 500 A. to 30,000 A. and free from vacuoles, which was about 30μ thick.

The "bubble point of this fibre" was determined as follows: one end of a 10 cm. sample of fibre was blocked. Through the other end, the fibre was subjected to a nitrogen pressure and the fibre was dipped into a bath of methanol. Evolution of nitrogen in the bath was observed when the pressure reached 1.5 bars: this was the bubble point.

A further 10 cm. sample of the same filament was subjected to a water pressure of 2 bars; a flow rate of water through the wall of about 6 cm.³/hour per metre of filament was observed.

EXAMPLE 3

Example 2 was repeated, using a mixture of water with DMF in the weight ratio of 20 to 80 instead of 30 to 70 as the internal coagulating bath.

A fibre having the same physical characteristics as in Example 1 was obtained. Its bubble point was 2.5 bars. The flow rate of water under a pressure of 2 bars was 55 cm.³/hour per metre of filament.

EXAMPLE 4

Example 1 was repeated with the introduction of the following modifications:

(a) The polymer solution consisted of a mixed solution of the terpolymer and of urea in DMSC with the respective weight ratios of these three constituents being 9 to 18 to 73. The temperature of the polymer solution was 52° C. and its flow rate 2.5 cm.³/minute;

(b) The internal coagulating bath was glycol at 52° C. and its flow rate was 3 cm.³/minute;

(c) The external coagulating bath was pure water at 25° C.;

(d) The speed of the fibre when being wound on the drum was 4 m./minute.

A tubular fibre, comprising a network of mutually intercommunicating pores whose diameter ranged from 500 A. to 30,000 A., was obtained having an external diameter of 1.5 mm., an internal diameter of 1 mm. and a 15μ thick internal skin. The fibre was furthermore entirely free from vacuoles.

EXAMPLE 5

Example 1 was repeated with the following modifications:

(a) The polymer solution consisted of a mixed solution of the terpolymer, urea, and glycol in DMSO, the respective weight ratios of these four constituents being 9 to 18 to 5 to 68. The temperature of the polymer solution was 70° C. and its flow rate was 3 cm.³/minute;

(b) The internal coagulating bath was glycol at 70° C. and its flow rate was 2.5 cm.³/minute;

(c) The external coagulating bath was a mixture of equal volumes of water and glycol;

(d) The speed of the fibre when being wound was 3.2 m./minutes;

(e) The spinneret dipped into the external coagulating bath, there being no travel through air.

A tubular fibre, comprising a network of mutually intercommunicating pores whose average diameter ranged from 500 A. to 30,000 A. was obtained, having an external diameter of 0.9 mm., an internal diameter of 0.7 mm., and a 100μ thick external skin. The fibre was furthermore entirely free from vacuoles.

EXAMPLE 6

Example 5 was repeated using water in place of glycol as the internal coagulating bath.

A fibre with the same physical characteristics but furthermore possessing an 0.5μ thick internal skin was obtained.

I claim:

1. A tubular fiber containing an axially-disposed, continuous channel devoid of macromolecular material and having a skin, wherein any pores it may contain have a diameter of less than 500 A., over a peripheral external, or a peripheral internal zone, or both, the zone or zones comprising a network of mutually intercommunicating pores of a diameter from 500 A. to 30,000 A. and being essentially free from vacuoles.

2. The fibre according to claim 1 which is entirely free from vacuoles.

3. The fibre according to claim 1, made of polyacrylonitrile, a polyurethane, polyvinyl chloride or a copolymer of acrylonitrile with methyl methacrylate.

4. The fibre according to claim 3, which is composed of a terpolymer of acrylonitrile, methyl methacrylate and a p-vinyloxybenzenesulphonate.

References Cited

UNITED STATES PATENTS

| | | | |
|---|---|---|---|
| 3,038,237 | 6/1962 | Taylor Jr. | 161—172 |
| 3,228,876 | 1/1966 | Mahon | 210—321 X |
| 3,228,877 | 1/1966 | Mahon | 210—321 X |
| 3,422,008 | 1/1969 | McLain | 210—321 X |
| 3,423,491 | 1/1969 | McLain et al. | 161—178 X |

ROBERT F. BURNETT, Primary Examiner

R. O. LINKER, JR., Assistant Examiner

U.S. Cl. X.R.

161—180, 181; 210—321; 264—209